(12) United States Patent (10) Patent No.: US 8,433,744 B1
Harding (45) Date of Patent: Apr. 30, 2013

(54) PROGRAMMABLE MULTIPLY ACCUMULATE (MAC) CIRCUIT

(75) Inventor: Aidan Harding, Princes Risborough (GB)

(73) Assignee: Altera Corporation, San Jose, CA (US)

( * ) Notice: Subject to any disclaimer, the term of this patent is extended or adjusted under 35 U.S.C. 154(b) by 1255 days.

(21) Appl. No.: 12/284,369

(22) Filed: Sep. 22, 2008

(51) Int. Cl.
*G06F 7/52* (2006.01)
(52) U.S. Cl.
USPC .......................................................... 708/620
(58) Field of Classification Search ........... 708/620–632
See application file for complete search history.

(56) References Cited

U.S. PATENT DOCUMENTS

| | | | |
|---|---|---|---|
| 6,430,589 B1* | 8/2002 | Jennings, III | 708/620 |
| 7,522,581 B2* | 4/2009 | Acharya et al. | 370/352 |
| 2004/0186872 A1* | 9/2004 | Rupp | 708/631 |
| 2005/0144216 A1* | 6/2005 | Simkins et al. | 708/620 |
| 2009/0128596 A1* | 5/2009 | Babu | 347/16 |

OTHER PUBLICATIONS

FIR Compiler User Guide, Compiler Version 7.2, Altera Corporation, Oct. 2007, http://www.altera.com/products/ip/dsp/filtering/m-alt-fir-compiler.html, pp. 1-86.

\* cited by examiner

*Primary Examiner* — Tan V. Mai
(74) *Attorney, Agent, or Firm* — Mauriel Kapouytian & Treffert LLP; Ararat Kapouytian (57) ABSTRACT

A multiply-accumulate (MAC) circuit including a queue circuit programmable at runtime is described. In one embodiment, the queue circuit includes a main queue that is programmable at runtime and a supplementary queue. In one embodiment, the queue circuit further includes M multiplexers coupled to the main queue and the supplementary queue, where M is an integer greater than or equal to one. In one embodiment, the MAC circuit further includes M multiplier elements coupled to the queue circuit and an accumulator circuit coupled to the M multiplier elements. The M multiplier elements receive multiplicands from the queue circuits and provide results of multiplications to the accumulator circuit. The accumulator circuit maintains a running sum of the results of the M multiplications performed by the M multiplier elements. In one embodiment, the accumulator circuit includes two adder circuits. A first adder circuit maintains a running sum of the multiplications between multiplicands of the current word being processed. A second adder circuit is used to accumulate the results of multiplications between multiplicands of the next data word to be processed when the MAC circuit is transitioning from one word to the next.

19 Claims, 6 Drawing Sheets

PROGRAMMABLE MULTIPLY ACCUMULATE (MAC) CIRCUIT

BACKGROUND

The invention relates to the field of multiply-accumulate (MAC) circuits.

In a single MAC operation, two numbers are multiplied by a multiplier element and the result is stored in an accumulator register. The results of further multiplications are added to the number stored in the accumulator. In this way, two series of numbers can be pair-wise multiplied and a running sum of the results maintained. At the end, the accumulator contains the sum of all the multiplications.

The MAC operation is one of the fundamental operations of digital signal processing. For example, a finite impulse response (FIR) filter is implemented as a series of MAC operations. The filter has as its input a sequence of n data values (or taps), $d_0, d_1, \ldots, d_{n-1}$, and n filter coefficient values, $c_0, c_1, \ldots, c_{n-1}$, where n is an integer greater than or equal to one. The output of the filter is calculated as the sum of each data value multiplied with its corresponding coefficient, which is represented by the series below:

$$\sum_{i=0}^{n-1} d_i \times c_i$$

In general, a MAC circuit has a fixed number of multiplier elements which multiply multiplicands of a first word having n multiplicands by corresponding multiplicands of a second word having n multiplicands. In a MAC circuit with only one multiplier, each pair of multiplicands is multiplied sequentially and the result added to a running sum. If, on the other hand, there are as many multiplier elements as the number of multiplicand pairs, the multiplications can all be carried out in a single cycle, and the output of the multipliers added together in a single step. In typical implementations of MAC circuits, however, there are fewer multiplier elements than the number of multiplicand pairs. In such a case, more than one cycle of multiplications is required for calculating the final result of MAC operations. If the number of pairs is exactly divisible by the number of multiplier elements, the multipliers will be fully utilized on each cycle of the MAC circuit operation. If the number of multiplicand pairs is not exactly divisible by the number of multiplier elements, the multiplier elements will not be fully utilized on either the first or last cycle of multiplications.

Additionally, when processing more than one word of data, if n is not exactly divisible by the number of multiplier elements, the last round of multiplications will not fully utilize all the multiplier elements during transitions from one word to the next.

SUMMARY

One embodiment of the present invention provides a MAC circuit including a queue circuit programmable at runtime. In one embodiment, the queue circuit includes a main queue that is programmable at runtime and a supplementary queue. In one embodiment, the queue circuit further includes M multiplexers coupled to the main queue and the supplementary queue, where M is an integer greater than or equal to one. In one embodiment, the MAC circuit further includes M multiplier elements coupled to the queue circuit and an accumulator circuit coupled to the M multiplier elements. The M multiplier elements receive multiplicands from the queue circuits and provide results of multiplications to the accumulator circuit. The accumulator circuit maintains a running sum of the results of the M multiplications performed by the M multiplier elements.

In one embodiment, the accumulator circuit includes two adder circuits. A first adder circuit maintains a running sum of the multiplications between multiplicands of the current word being processed. A second adder circuit is used to accumulate the results of multiplications between multiplicands of the next data word to be processed when the MAC circuit is transitioning from one word to the next.

In one embodiment, the queue circuit includes a plurality of queue module, where each queue module includes a main queue programmable at runtime, a supplementary queue, and M multiplexers.

In the MAC circuit of the present invention, the multipliers are utilized during transitions from one word to the next, even when the number of multiplicand pairs in the one word is not exactly divisible by the number of multipliers.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
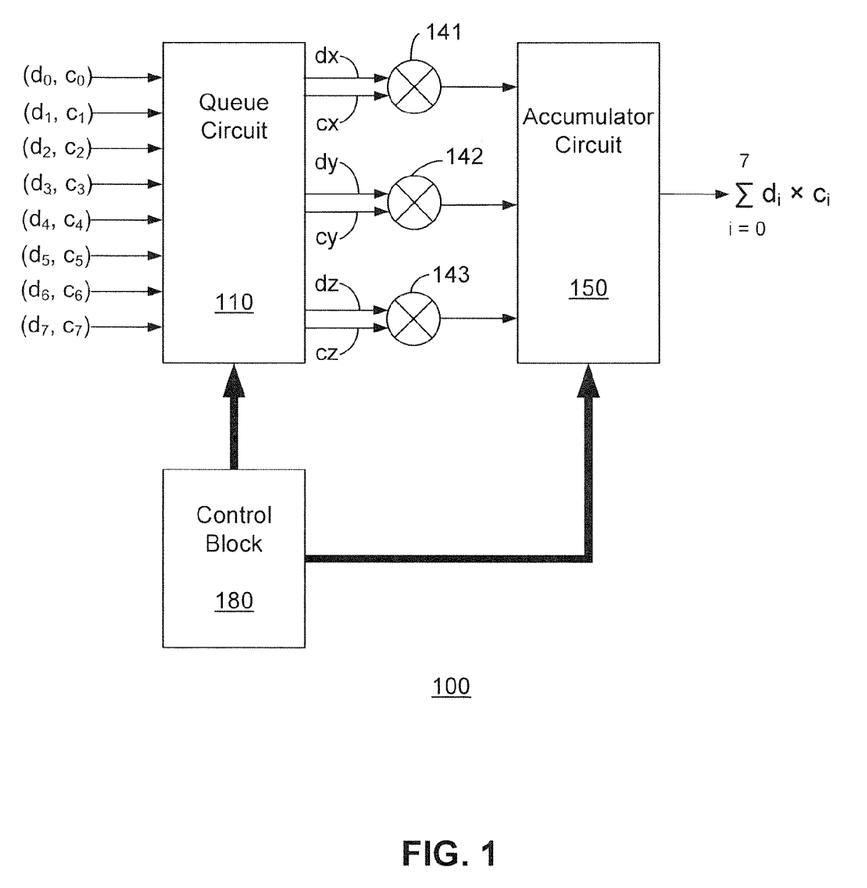
FIG. 1 is a block diagram of one embodiment of the MAC circuit of the present invention.

FIG. 1 is a block diagram of one embodiment of the MAC circuit of the present invention. MAC circuit 100 includes queue circuit 110, accumulator circuit 150, control block 180, and multiplier elements 141, 142, and 143.

Queue circuit 110 receives eight data-coefficient pairs (d0, c0), (d1, c1), (d2, c2), (d3, c3), (d4, c4), (d5, c5), (d6, c6) and (d7, c7) on its inputs and provides three data-coefficient pairs (dx, cx), (dy, cy), and (dz, cz) on its outputs. In the embodiment of FIG. 1, data elements d0, d1, . . . , d7 together constitute a data word. Similarly, coefficient elements c0, c1, . . . , c7 together constitute a coefficient word. In the embodiment of FIG. 1, each word has eight elements. It is to be noted that the present invention may be used in the context of words of other sizes. Queue circuit 110 is responsible for ensuring that the three data and coefficient elements supplied to multiplier elements 141, 142, and 143 are correctly ordered. Queue circuit 110 also ensures that all multipliers receive data to process while queue circuit 110 has sufficient data to provide to the multiplier elements.

Data-coefficient pairs (dx, cx), (dy, cy), and (dz, cz) are provided to multiplier elements 141, 142, and 143, respectively, wherein x, y, and z are integers ranging from 0 to 7 which represent the index of the data element. The supplied multiplicands are multiplied by multiplier elements 141, 142, and 143, and the results are fed to accumulator circuit 150. Accumulator circuit 150 generates the final accumulated sum $\Sigma_{i=0}^{7} d_i \times c_i$ of the pair-wise multiplication of the word of data with the word of coefficients. Multiple words may be processed in succession by MAC circuit 100.

As shown, control block 180 is coupled to both queue circuit 110 and accumulator circuit 150. Each coupling may include multiple connections with each connection carrying specific control signals destined for individual elements within queue circuit 110 and accumulator circuit 150.

Figure 2:
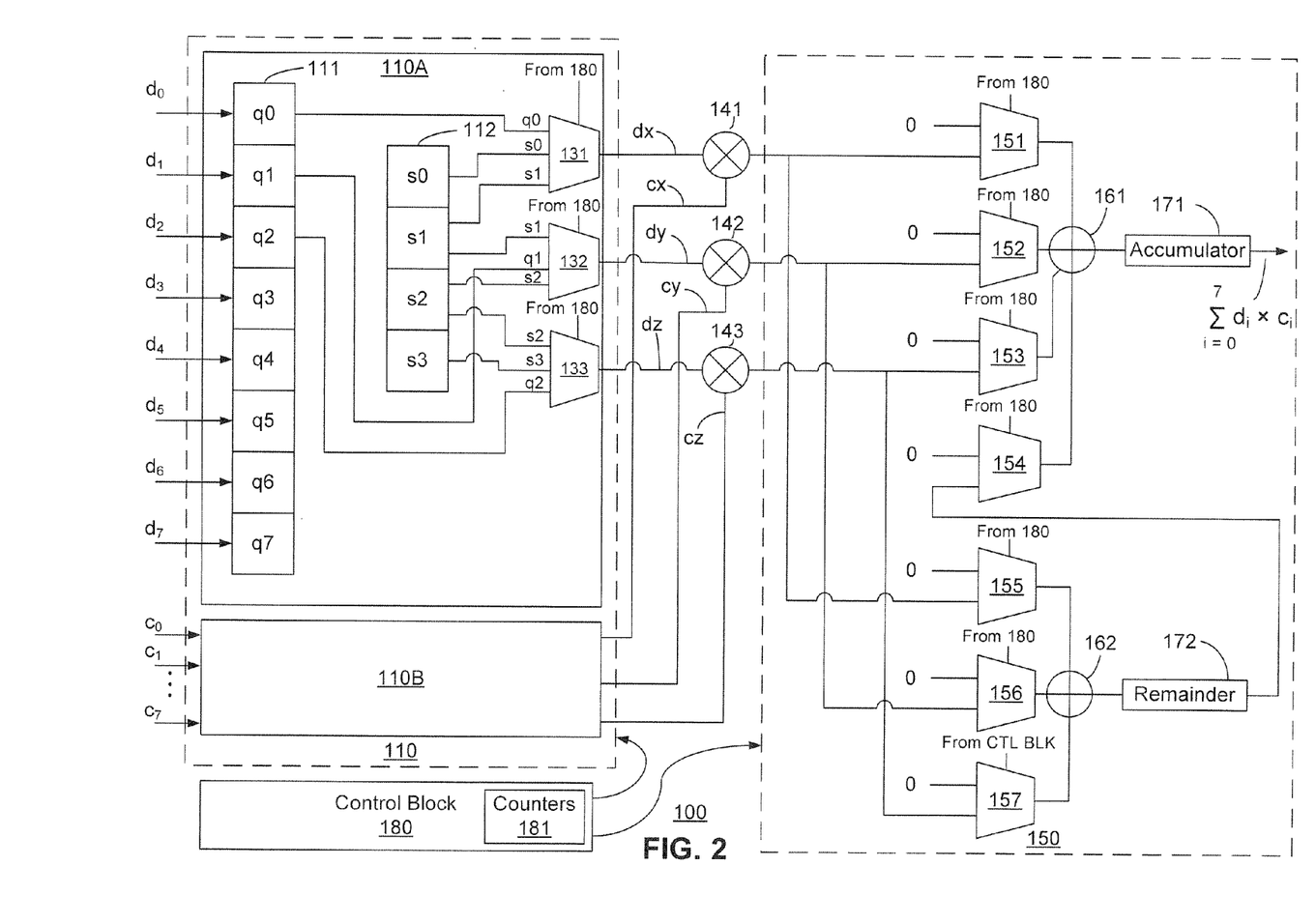
FIG. 2 is a logic-level diagram of one embodiment of the MAC circuit of the present invention.

FIG. 2 is a logic level diagram of one embodiment of MAC circuit 100 illustrated in FIG. 1. Data word (d0 . . . d7) is input to queue module 110A and coefficient word (c0 . . . c7) is input to queue module 110B. In the embodiment of FIG. 1, queue module 110B is structurally identical to queue module 110A. Therefore, only queue module 110A is shown in detail, while queue module 110B is shown as a block. In another embodiment, queue modules 110A and 110B may be structurally different.

Queue module 110A includes main queue 111, supplementary queue 112, and multiplexers 131, 132, and 133. Main queue 111 includes eight positions q0, q1, q2, q3, q4, q5, q6, and q7 that receive data elements d0, d1, d2, d3, d4, d5, d6, and d7, respectively. Supplementary queue 112 includes four positions s0, s1, s2, and s3. It is to be noted that each position in the main and supplementary queue is a memory location for storing an element of a word. Data is copied from main queue 111 to supplementary queue 112 in response to control signals from control block 180. As noted above, queue module 110B is identical to queue module 110A except that it receives coefficients elements (c0 . . . c7) instead of data elements (d0 . . . d7). In one embodiment, where data and their corresponding coefficients are fed into the queue circuit together, the control signals for both queue module 110A and 110B are identical. In another embodiment where data and their corresponding coefficient are not fed into the queue circuit together, the control signals to the queue modules may be different.

In one embodiment, MAC circuit 100 is programmable at runtime, i.e., in user mode. More specifically, in one embodiment, the size Q of main queue 111 is programmable at runtime, where Q is any integer greater than M, where M is an integer representing the number of multipliers in the MAC circuit. In one embodiment, a portion of a larger memory block is allocated to main queue 111, where the portion allocated to main queue 111 reflects the size Q. As illustrated, Q is eight in the embodiment shown in FIG. 2, reflecting the size of the data word to be processed. In one embodiment, the size S of the supplementary queue is programmed to be the smaller of (2M−2) and (Q−1), where S is an integer. In one embodiment, S is programmable at runtime. In MAC circuit 100, the size S of supplementary queue 112 is equal to (2M−2), i.e., 4, which is smaller than (Q−1), i.e., 7. In one embodiment, Q can be programmed before operation of MAC circuit 100 begins or in the interval between processing successive data words.

The programmability feature of the MAC circuit of the present invention is particularly useful in systems having high data rates. Moreover, it is particularly useful in systems having dynamically changing requirements in terms of taps and data rates. For example, it is particularly useful in downscaling video to a dynamically changing output size. In such cases, as the amount of downscaling increases, more taps are required, while the data rate at the output decreases. The ability to dynamically vary the number of taps, as in the present invention, is useful in such a context.

Multiplexers 131, 132, and 133, each have three inputs and a single output. As shown, the inputs of multiplexer 131 are coupled to main queue position q0 and supplementary queue positions s0 and s1. The inputs of multiplexer 132 are coupled to main queue position q1 and supplementary queue positions s1 and s2. Lastly, the inputs of multiplexer 133 are coupled to main queue position q2 and supplementary queue positions s2 and s3.

The outputs of multiplexers 131, 132, and 133 are data elements dx, dy, and dz, respectively. The outputs of queue module 110B are coefficient elements cx, cy, and cz. As shown, each multiplier element receives a data and coefficient element for multiplication. Multiplier element 141 receives data element dx and coefficient element cx, multiplier element 142 receives data element dy and coefficient element cy, and multiplier element 143 receives data element dz and coefficient element cz.

Accumulator circuit 150 includes multiplexers 151, 152, 153, 154, 155, 156, and 157. Multiplexer 154 may also herein be referred to as carry multiplexer 154. The output of each of multiplexers 151, 152, 153, and carry multiplexer 154 is supplied to adder element 161 which supplies its output to accumulator register 171. The output of each of multiplexers 155, 156, and 157 is supplied to adder element 162 which supplies its output to remainder register 172. The output of remainder register 172 is coupled to one of the inputs of carry multiplexer 154.

Accumulator register 171 accumulates the results of addition operations by adder element 161 and remainder register 172 accumulates the results of addition operations by adder element 162. In one embodiment, MAC circuit 100 overlaps the processing of two consecutive data words. More specifically, MAC circuit 100 uses all its multipliers to perform multiplication during the transition from one word to the next. During such transitions, the first adder circuit, which includes multiplexers 151-154, adder element 161, and accumulator register 171 accumulates the results of processing the current data word and stores such results in accumulator register 171, while the second adder circuit, which includes multiplexers 155-157, adder element 162, and remainder register 172 accumulates the results of processing a new data word and store such results in remainder register 172. It is to be noted that accumulator register 171 not only stores data it receives from adder element 161, but also adds previously stored results with the latest results which it receives from adder element 161. In other words, accumulator register 171 is both a register and an adder. Similarly, in one embodiment, remainder register 172 is both a register and an adder.

Control block 180 is coupled to queue circuit 110 and accumulator circuit 150. More specifically, in one embodiment, control block 180 is coupled to the selection control inputs of multiplexers 131, 132, 133 of queue module 110A, the selection control inputs of multiplexers (not shown) of queue module 110B, and the selection control inputs of multiplexers 151 to 157 of accumulator circuit 150. Additionally, in one embodiment, control block 180 is coupled to queue circuit 110 to direct the writing of data to main queue 111 and the copying of data from main queue 111 to supplementary queue 112.

Control block 180 includes counters 181 which track the movement of data through main queue 111 and supplementary 112. Counters 181 include counters for the index of the next data element needed for MAC circuit 100's operation, the index of the data element at position q0 of main queue 111, the index of the data element at position s0 of supplementary queue 112, and the number of data elements to read from supplementary queue 112.

Control signals from control block 180 direct the flow of data from main queue 111 and supplementary queue 112 to multiplier elements 141, 142, and 143 by controlling multiplexers 131, 132, and 133. By selecting the appropriate inputs on the multiplexers, different positions of main queue 111 and supplementary 112 become connected to the multipliers. This enables queue circuit 110 to supply data and coefficient elements to multiplier elements 141, 142, and 143 such that they are correctly ordered and paired. The method of selecting inputs to multiplexers 131, 132, and 133 will be discussed in detail with reference to FIGS. 3A-3H.

In MAC circuit 100, control block 180 is shown as a single entity controlling both queue modules 110A and 110B. However, it is to be noted that control block 180 may be made up of separate sub-modules such that each sub-module controls a single queue module of a plurality of queue modules.

The output of multiplier element 141 is coupled to inputs of multiplexers 151 and 155, the output of multiplier 142 is coupled to inputs of multiplexers 152 and 156, and the output of multiplier 143 is coupled to inputs of multiplexers 153 and 157. Carry multiplexer 154 is coupled on one input to the output of remainder register 172. The other input of each of the multiplexers in accumulator circuit 150 is coupled to a binary LOW input, more specifically a 0.

In addition to directing the flow of data between queue module 110A and multiplier elements 141 to 143, control block 180 also directs the flow of data within accumulator circuit 150 by providing selection signals to multiplexers 151 to 157. While MAC circuit 100 is processing a single word, control block 180 provides select signals to multiplexers 151 to 153 to select the inputs they receive from multiplier elements 141 to 143 rather than their 0 inputs. Also, during this stage, control block 180 provides a select signal to carry multiplexer 154 to select its 0 input rather than the input signal that it receives from remainder register 172. Finally, during this stage, control block 180 provides select signals to multiplexers 155 to 158 to select their 0 inputs rather than the input signals they receive from multiplier elements 141 to 143.

During operation of MAC circuit 100, there will be times at which it will be finishing processing one word of data and beginning to process the next one. During these transitions from one word to the next word, if the number of multiplicand pairs in the one word is exactly divisible by the number of multiplier elements, then all the multiplier elements would be processing words from the one word. As a result, selections by multiplexers 151 to 157 would continue as described above. If on the other hand, the number of multiplicand pairs in the one word is not exactly divisible by the number of multiplier elements, then during the transition from one word to the next word, some of multipliers elements 141 to 143 would be processing elements of the one word, while the other multiplier elements among multiplier elements 141 to 143 would be processing elements of the next word. At these times, control block 180 would (1) provide select signals to multiplexers 151 to 153 such that they select outputs from multiplier elements 141 to 143 belonging to the one word, (2) provide select signals to multiplexers 155 to 157 such that they select outputs from multipliers 141 to 143 belonging to the next word, and (3) provide a select signal to carry multiplexer 154 to select its 0 input rather than the input signal from remainder register 172. As a result, accumulator register 171 would accumulate results of multiplications for the one word until such results have been fully accumulated therein, while remainder register 172 accumulates the results of multiplications for the next word.

After the transition from the one word to the next word, accumulator register 171 would have the final MAC operation results for the one word, whereas remainder register 172 would have results for the next word. After accumulator register 171 has output the final MAC operation results for the one word, control block 180 would provide a select signal to carry multiplexer 154 such that it selects the input signal it receives from remainder register 172. This output of remainder register 172 would be added by adder element 161 to other results belonging to the next word selected by multiplexers 151 to 153. Thereafter, multiplexers 151-154, adder element 161, and accumulator register 171 would continue to process multiplication results belonging to the next word.

FIGS. 3A-3H illustrate the operation of queue module 110A by showing the contents of main queue 111 and supplementary queue 112 in successive stages of the operation of MAC circuit 100 as it processes three successive data words, d, d', and d". Each data word has eight data elements and each element is referenced by an index ranging from 0 to 7. For example, data word d' includes data elements d0', d1', d2', d3', d4', d5', d6', and d7' with index numbers 0, 1, 2, 3, 4, 5, 6, and 7, respectively. At each stage, the data elements contained in positions q0 through q7 of main queue 111 and positions s0 through s3 of supplementary queue 112 are indicated by the label of the contents at each position. An empty position is marked by an X. Position q0 of main queue 111 and position s0 of supplementary queue 112 may be referred to herein as the head of main queue 111 and the head of supplementary queue 112, respectively. The processing of data words d, d', and d" by module 110A serves to illustrate the identical processing of coefficient words c, c', and c" by module 110B. As noted earlier, in this embodiment, the data and coefficient words arrive together and are controlled with the identical control signals from control block 180.

At each stage, control block 180 determines which positions of main queue 111 and/or supplementary queue 112 contain the data elements to be read. In one embodiment, control block 180 first determines whether to read any data from supplementary queue 112. If (1) position q0 of main queue 111 contains the next needed data element, or (2) the index of the next needed data element is less than that of the data element in position s0 of supplementary queue 112, no supplementary queue positions will be read. In such a case, all M, which in this example is equal to 3, needed data elements will be read from main queue 111. More specifically, they will be read from positions q0 to q2 of main queue 111. If control block 180 determines that data should be read from supplementary queue 112, it next determines how many positions of supplementary queue 112 to read from. This is the smaller of M, which in this example is 3, and Q minus the index of the next needed data element. Next, control block 180 determines which position of main queue 111 or supplementary queue 112 contains the next needed data element. If the number of positions of supplementary queue 112 that will be read is non-zero, control block 180 determines the first position of supplementary queue 112 to read from. That position of supplementary queue 112 is equal to the index of the next needed data element minus the index of the data element in position s0 of supplementary queue 112. After reading from supplementary queue 112, any remaining data elements are read beginning at position q0 of main queue 111. Thus, if T data elements, where T is an integer greater than or equal to 0, are read from supplementary queue 112, then M−T data elements are read from main queue 111. The positions of main queue 111 and supplementary queue 112 to be read from at each stage are circled in FIGS. 3A-3H.

Control block 180 issues control signals to the multiplexers in queue circuit 110 such that the proper data elements are read from queue circuit 110 and fed to multiplier elements 141-143 of MAC circuit 100. After feeding data to multiplier elements 141-143, MAC circuit 100 determines whether to change the data in main and supplementary queues 111 and 112 and how to change the data. Control block 180 determines that the data needs to be changed if (1) either the index of the data element in position s0 of supplementary queue 112 is less than or equal to (i.e., is not greater than) the index of the data element in position q0 of main queue 111 or (2) the number of data elements read from the supplementary queue in the previous stage was not equal to M. Following the decision to change the data, the data elements in positions q1, q2, q3, and q4 of main queue 111 are respectively copied to positions s0, s1, s2, and s3 of supplementary queue 112. Control block 180 next determines whether to supply a new word of data to main queue 111 or advance the existing data elements in main queue 111 by M positions. A new word of data is supplied if the number of data elements in main queue 111 is less than 2M, which in this example is equal to 6. Otherwise, the existing data elements in main queue 111 are advanced by M positions, which in this example is 3, and would mean that the data elements in positions q3, q4, and q5 would be copied to positions q0, q1, and q2, respectively.

Figure 3A:
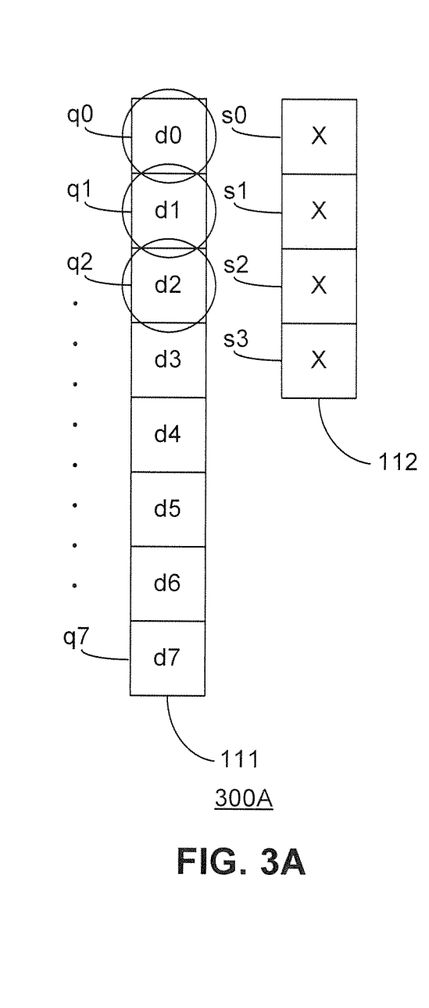
FIGS. 3A, 3B, 3C, 3D, 3E, 3F, 3G, and 3H illustrate an example of the successive stages in the operation of a queue circuit of a MAC circuit in accordance with an embodiment of the present invention.

FIG. 3A illustrates the contents of main queue 111 and supplementary queue 112 at the initial stage 300A. As shown, main queue 111 contains data word d and supplementary queue 112 is empty, as indicated by all its positions being marked by an X. Control block 180 determines which positions of main queue 111 or supplementary queue 112 contain valid data elements for the first round of multiplications with corresponding coefficient elements. As position q0 has the next needed data element, no data is read from supplementary queue 112. Consequently, all M data elements are read from main queue 111. More specifically, they are read from positions q0 to q2 of main queue 111. Therefore, data elements d0, d1, and d2 are supplied to multipliers 141, 142, and 143, respectively.

Figure 3B:
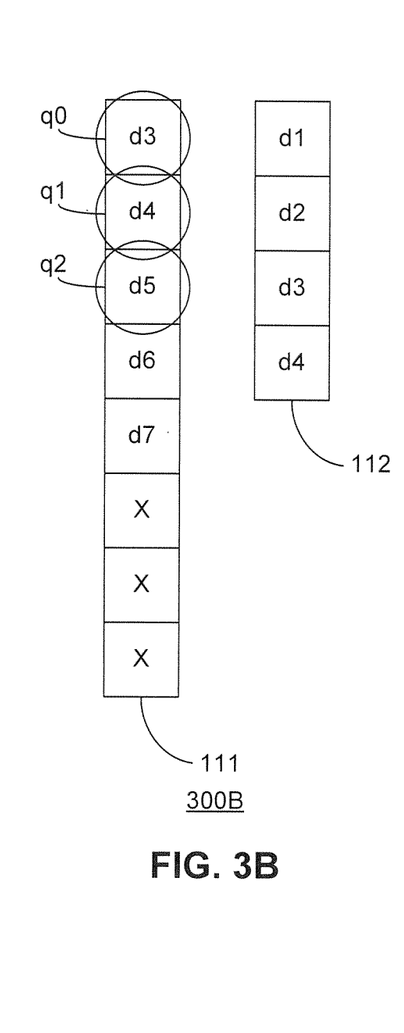

FIG. 3B illustrates the contents of main queue 111 and supplementary queue 112 in stage 300B. FIGS. 3A and 3B illustrate that the contents of the queues changed between stages 300A and 300B. As explained above, the decision to change the contents of the queues depends on one of two conditions being satisfied in the previous stage. In stage 300A, none of the data elements that were read came from supplementary queue 112, one of the conditions which, if satisfied, would have been sufficient for changing the contents of the queues. Therefore, between stages 300A and 300B, data elements d1, d2, d3, and d4 were respectively copied from positions q1, q2, q3, and q4 of the main queue to positions s0, s1, s2, and s3 of the supplementary queue, respectively. Also, between stages 300A and 300B, data elements in the main queue were advanced by three positions because, in stage 300A, the number of data elements in the main queue, which in this case was 8, was not less than 2M, which in this example is equal to 6. The resulting contents of the queues are illustrated in stage 300B in FIG. 3B.

At stage 300B, control block 180 determines from which positions of the queues to read data. It does this by first determining whether any positions of supplementary queue 112 should be read. In stage 300B, the next needed data element, which in this stage of this example is d3, occupies position q0 of main queue 111. Therefore, the next three data elements are read from positions q0, q1, and q2 of main queue 111 and no data is read from supplementary queue 112.

Figure 3C:
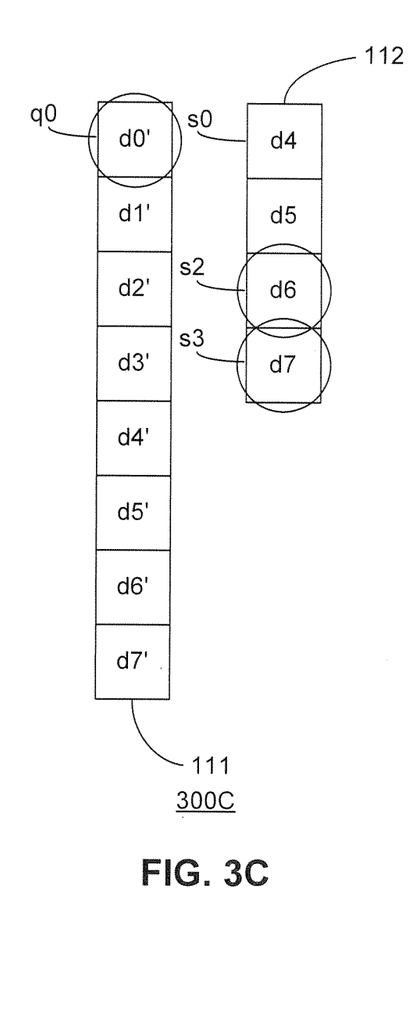

FIG. 3C illustrates the contents of main queue 111 and supplementary queue 112 in stage 300C. FIGS. 3B and 3C illustrate that the contents of the queues changed between stages 300B and 300C. The contents of the queues were changed because no data elements were read from supplementary queue 112 in stage 300B. In addition, a new word of data was written to the main queue because the number of data elements in main queue 111 in stage 300B was less than 2M, which in this example is equal to 6. Therefore, data elements d4, d5, d6, d7 at positions q1, q2, q3, and q4, respectively, of the main queue were respectively copied to positions s0, s1, s2, and s3 of the supplementary queue and a new data word d' was written to the main queue. The resulting contents of the queues are illustrated in stage 300C in FIG. 3C.

At stage 300C, control block 180 determines from which positions of the queues to read data. Neither of the two conditions, either one of which would preclude reading from supplementary queue 112, is satisfied in stage 300C. Position q0 of main queue 111 does not contain the next needed data element, which in this stage of this example is d6, and the index of the next needed data element, which is 6, is not less than the index of the data element at position s0 of supplementary queue 112, which at stage 300C is 4. The first position of supplementary queue 112 from where data will be read is equal to the index of the next needed data element minus the index of the data element in position s0 of supplementary queue 112, which is 6−4 and is equal to 2. Hence, the first position of supplementary queue 112 read is s2. The number of data elements to be read from supplementary queue 112 is equal to the smaller of M, which in this example is 3, and Q minus the index of the next needed data element, which is 8−6 and is equal to 2. Hence, two data elements are read from supplementary queue 112 beginning at position s2 and the remaining data element is read from main queue 111. The circled positions in FIG. 3C indicate the data elements read from main queue 111 and supplementary queue 112 in stage 300C.

Figure 3D:
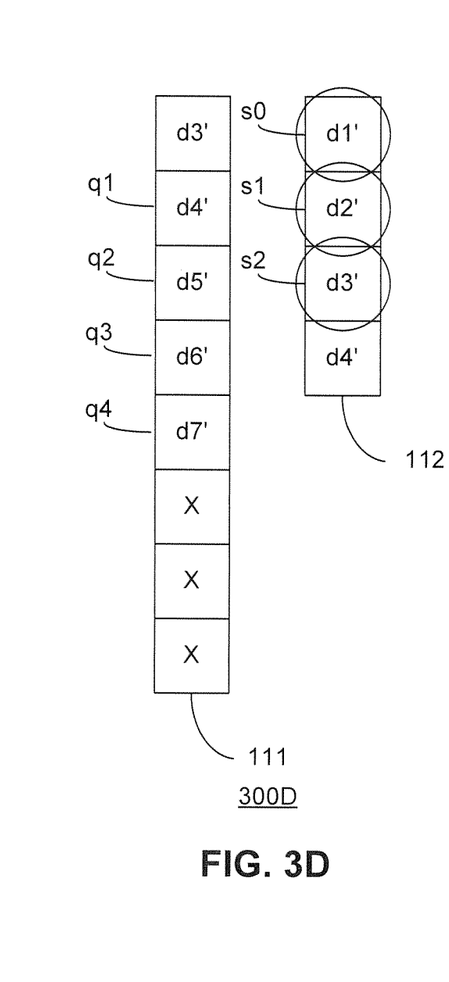

FIG. 3D illustrates the contents of main queue 111 and supplementary queue 112 at stage 300D. FIGS. 3C and 3D illustrate that the contents of the queues changed between stages 300C and 300D. The number of positions of supplementary queue 112 from which data was read in stage 300C in FIG. 3C was 2, thereby satisfying the condition for changing the contents of the queues. A new word of data was not supplied to main queue 111 because the number of data elements in main queue 111 in stage 300C was not less than 2M, which is equal to 6 in this example. Data elements d1', d2', d3', and d4' from positions q1, q2, q3, and q3, respectively, of the main queue were copied to positions s0, s1, s2, and s3, respectively, of the supplementary queue, and data elements in the main queue were advanced by three positions. The resulting contents of the queues are illustrated in stage 300D in FIG. 3D.

At stage 300D, control block 180 determines from which positions of the queues to read data. Since position q0 of main queue 111 does not contain the next needed data element, which at this stage of this example is d1', and the index of the next needed data element, which at this stage is 1, is not less than the index of the data element in position s0 of supplementary queue 112, which in this stage is also 1, data will be read from supplementary queue 112. The number of data elements to be read from supplementary queue 112 is the smaller of M, which in this example is 3, and Q minus the index of the next needed data element, which is 8−1 and is equal to 7. The first position of supplementary queue 112 from which data is read is equal to the index of the next needed data element minus the index of the data element in position s0 of supplementary queue 112, which is 1−1 and is equal to 0. Hence, three positions, s0, s1, and s2, of supplementary queue 112 are read in stage 300D of FIG. 3D.

Figure 3E:
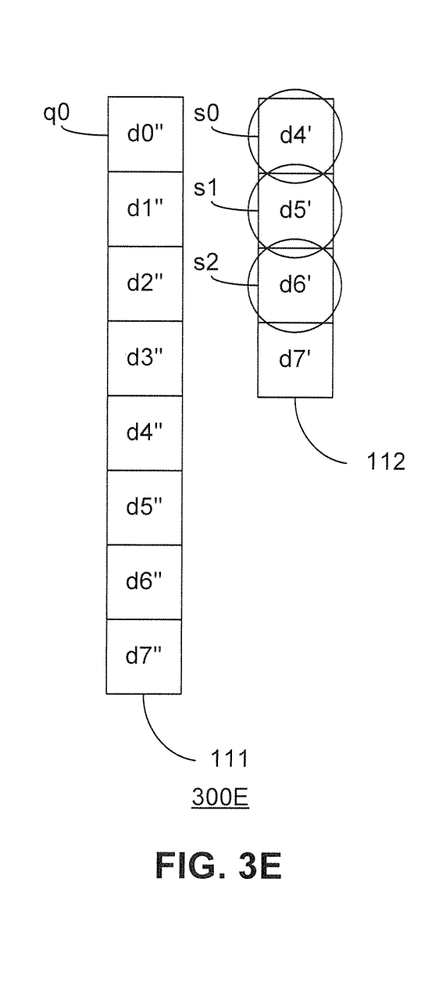

FIG. 3E illustrates the contents of main queue 111 and supplementary queue 112 in stage 300E. FIGS. 3D and 3E illustrate that the contents of the queues changed between stages 300D and 300E. Control block 180 determined that the contents of the queues must be changed because the index of the data element in position s0 of supplementary queue 112 in stage 300D, which at that stage was 1, was not greater than the index of the data element in position q0 of main queue 111, which at that stage was 3. The number of data elements that were in the main queue in stage 300D, which in this case was 5, was less than 2M, which is equal to 6. Therefore, a new word of data was supplied to the main queue. As a result, data elements d4', d5', d6', and d7' from positions q1, q2, q3, and q4, respectively, of the main queue were copied to positions s0, s1, s2, and s3, respectively, of the supplementary queue and a new data word d" was written to the main queue. Stage 300E in FIG. 3E illustrates the resulting state of main queue 111 and supplementary queue 112 after the contents of the queues were changed.

At stage 300E, control block 180 determines from which positions of the queues to read data. Data will be read from supplementary queue 112 because the index of the next needed data element, which in this stage of this example is 4, is not equal to the index of the data element in position q0 of main queue 111, which is 0, and the index of the next needed data element, which at this stage is 4, is not less than the index of the data element in position s0 of supplementary queue 112, which at this stage is also 4. The number of positions of supplementary queue 112 to be read is the smaller of M, which in this example is 3, and Q minus the index of the next needed data element, which is 8−4 and is equal to 4. The first position of supplementary queue 112 read is the index of the next needed data element minus the index of the data element in position s0 of supplementary queue 112, which is 4−4 and is equal to 0. Therefore, as shown in FIG. 3E, three data elements are read from positions s0, s1, and s2 of supplementary queue 112 in stage 300E.

Figure 3F:
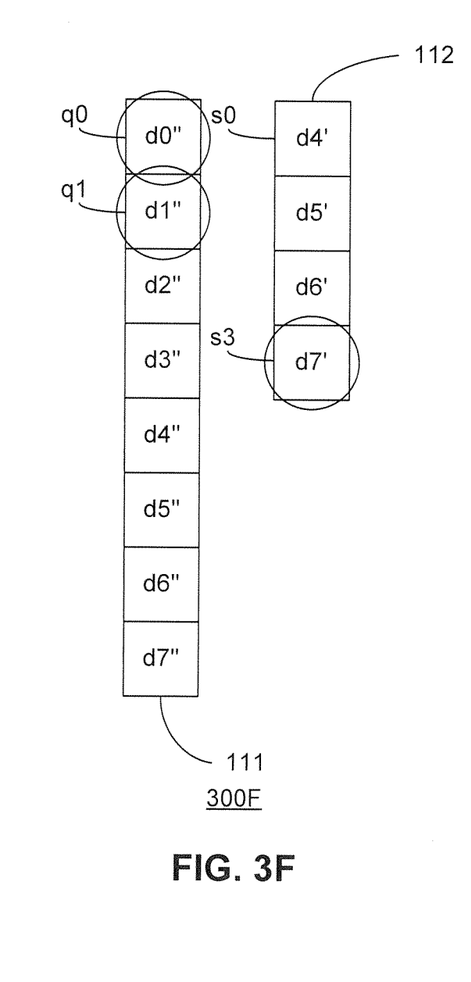

FIG. 3F illustrates the contents of main queue 111 and supplementary queue 112 at stage 300F. FIGS. 3E and 3F illustrate that the contents of the queues did not change between stages 300E and 300F. Control block 180 determined that stage 300E satisfied neither of the two conditions under which the queues should be changed. The data element in position s0 of supplementary queue 112, which in stage 300E was d4', had an index, in this example 4, that was not less than or equal to the index of the data element in position q0 of main queue 111, which in this example was 0. Additionally, the number of positions of supplementary queue 112 that were read in stage 300E was equal to M, which in this example is 3. Therefore, as shown in FIG. 3F, the transition from stage 300E to 300F did not change the contents of either main queue 111 or supplementary queue 112.

At stage 300F, control block 180 determines from which positions of the queues to read data. Stage 300F does not satisfy either of the two conditions which would preclude reading data from supplementary queue 112. Position q0 of main queue 111 does not have the next needed data element, which at this stage in this example is d7', and the index of the next needed data element, which in this case is 7, is not less than the index of the data element in position s0 of supplementary queue 112, which at this stage is 4. The number of data elements to be read from supplementary queue 112 is the smaller of M, which in this example is 3, and Q minus the index of the next needed data element, which is 8−7 and is equal to 1. The first position of supplementary queue 112 read is the index of the next needed data element minus the index of the data element in position s0 of supplementary queue 112, which is 7−4 and is equal to 3. Hence, data element d7' at position s3 of supplementary queue 112 and data elements d0" and d1" at positions q0 and q1, respectively, of main queue 111 are read in stage 300F.

Figure 3G:
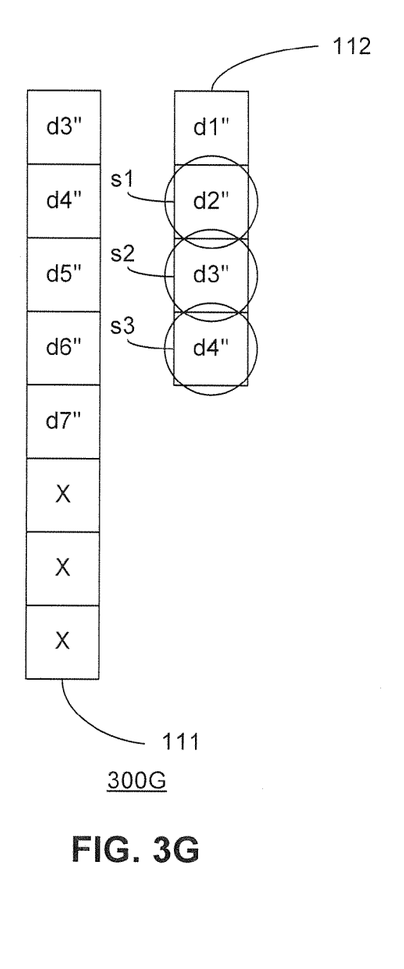

FIG. 3G illustrates the contents of main queue 111 and supplementary queue 112 at stage 300G. FIGS. 3F and 3G illustrate that the contents of the queues changed between stages 300F and 300G. Control block 180 determined that the data in the queues must be changed because the number of data elements read from supplementary queue 112 in stage 300F, which was 1, was not equal to M, which in this example is 3. A new word of data was not supplied to the queue circuit because the number of data elements in the main queue in stage 300F was 8, which was not less than 2M, which is 6 in this example. As a result, data elements from positions q1, q2, q3, and q4, of the main queue were copied to positions s0, s1, s2, and s3, respectively, of the supplementary queue, and the data elements in main queue were advanced by three positions. Stage 300G in FIG. 3G illustrates the resulting state of main queue 111 and supplementary queue 112 after the contents of the queues were changed.

At stage 300G, control block 180 determines from which positions of the queues to read data. Neither of the two conditions, either one of which preclude reading data from supplementary queue 112, are satisfied in this stage. Position q0 of main queue 111 does not have the next needed data element, which at this stage is d2", and the index of the next needed data element, which in this example is 2, is not less than the index of the data element in position s0 of supplementary queue 112, which at this stage is 1. The number of data elements to be read from supplementary queue 112 is the smaller of M, which in this example is 3, and Q minus the index of the next needed data element, which is 8−2 and is equal to 6. The position of the first data element to read from supplementary queue 112 is equal to the index of the next needed data element minus the index of the data element at position s0, which in this example is 2−1 and is equal to 1. Therefore, three data elements are read from positions s1, s2 and s3 of supplementary queue 112.

Figure 3H:
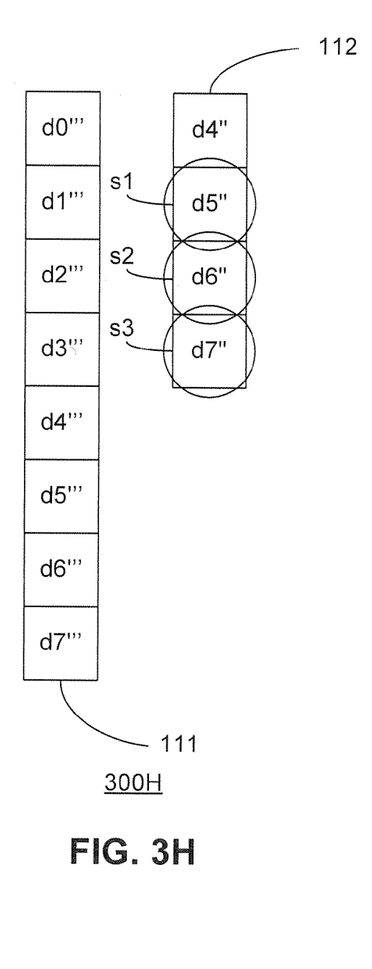

FIG. 3H illustrates the contents of main queue 111 and supplementary queue 112 at stage 300H. FIGS. 3G and 3H illustrate that the contents of the queues changed between stages 300G and 300H. Control block 180 determined that the contents of the queues should be changed because the index of the data element in position s0 of supplementary queue 112 in stage 300G, which in this example was 1, was less than or equal to the index of the data element in position q0 of main queue 111, which in stage 300G was 3. A new word d'" was written to the main queue because the number of data elements in main queue 111 in stage 300G, which was 5, was smaller than 2M, which in this example is equal to 6. As a result, data elements from positions q1, q2, q3, and q4 of the main queue were copied to positions s0, s1, s2, and s3, respectively, of the supplementary queue and a new data word d'" was written to the main queue. Stage 300H in FIG. 3H illustrates the resulting state of main queue 111 and supplementary queue 112 after the contents of the queues were changed.

At stage 300H, control block 180 determines from which positions of the queues to read data. Neither of the two conditions, either one of which preclude reading data from supplementary queue 112, are satisfied in this stage. Position q0 of main queue 111 does not have the next needed data element, which at this stage is d5", and the index of the next needed data element, which in this example is 5, is not less than the index of the data element in position s0 of supplementary queue 112, which at this stage is 4. The number of data elements to be read from supplementary queue 112 is the smaller of M, which in this example is 3, and Q minus the index of the next needed data element, which is 8–5 and is equal to 3. The position of the first data element to read from supplementary queue 112 is equal to the index of the next needed data element minus the index of the data element at position s0, which in this example is 5–4 and is equal to 1. Therefore, three data elements are read from positions s1, s2 and s3 of supplementary queue 112.

The method of supplying, reading, and changing the contents of the queues is described in detail in the COMPUTER PROGRAM LISTING (which is in the Java programming language) included at the end of this section. In one embodiment, control block 180 includes a state machine that implements this method.

MAC circuits embodying the present invention might be included in a variety of integrated circuits (ICs), including ICs that are programmable logic devices (PLDs) or application specific integrated circuits (ASICs). PLDs (also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), field programmable gate arrays (FPGAs), or by other names) provide the advantages of fixed ICs with the flexibility of custom ICs. Such devices typically provide an "off the shelf" device having at least a portion that can be programmed to meet a user's specific needs. ASICs have traditionally been fixed ICs. However, it is possible to provide an ASIC that has a portion or portions that are programmable. Thus, it is possible for an IC device to have qualities of both an ASIC and a PLD. The term PLD as used herein will be considered broad enough to include such devices.

PLDs have configuration elements that may be programmed or reprogrammed. Configuration elements may be realized as RAM bits, flip-flops, electronically erasable programmable read-only memory (EEPROM) cells, or other memory elements. Placing new data into the configuration elements programs or reprograms the PLD's logic functions and associated routing pathways. Configuration elements that are field programmable are often implemented as RAM cells (sometimes referred to as "configuration RAM" (CRAM)). However, many types of configurable elements may be used including static or dynamic RAM (SRAM or DRAM), electrically erasable read-only memory (EEROM), flash, fuse, and anti-fuse programmable connections. The programming of configuration elements could also be implemented through mask programming during fabrication of the device. While mask programming may have disadvantages relative to some of the field programmable options already listed, it may be useful in certain high volume applications.

Figure 4:
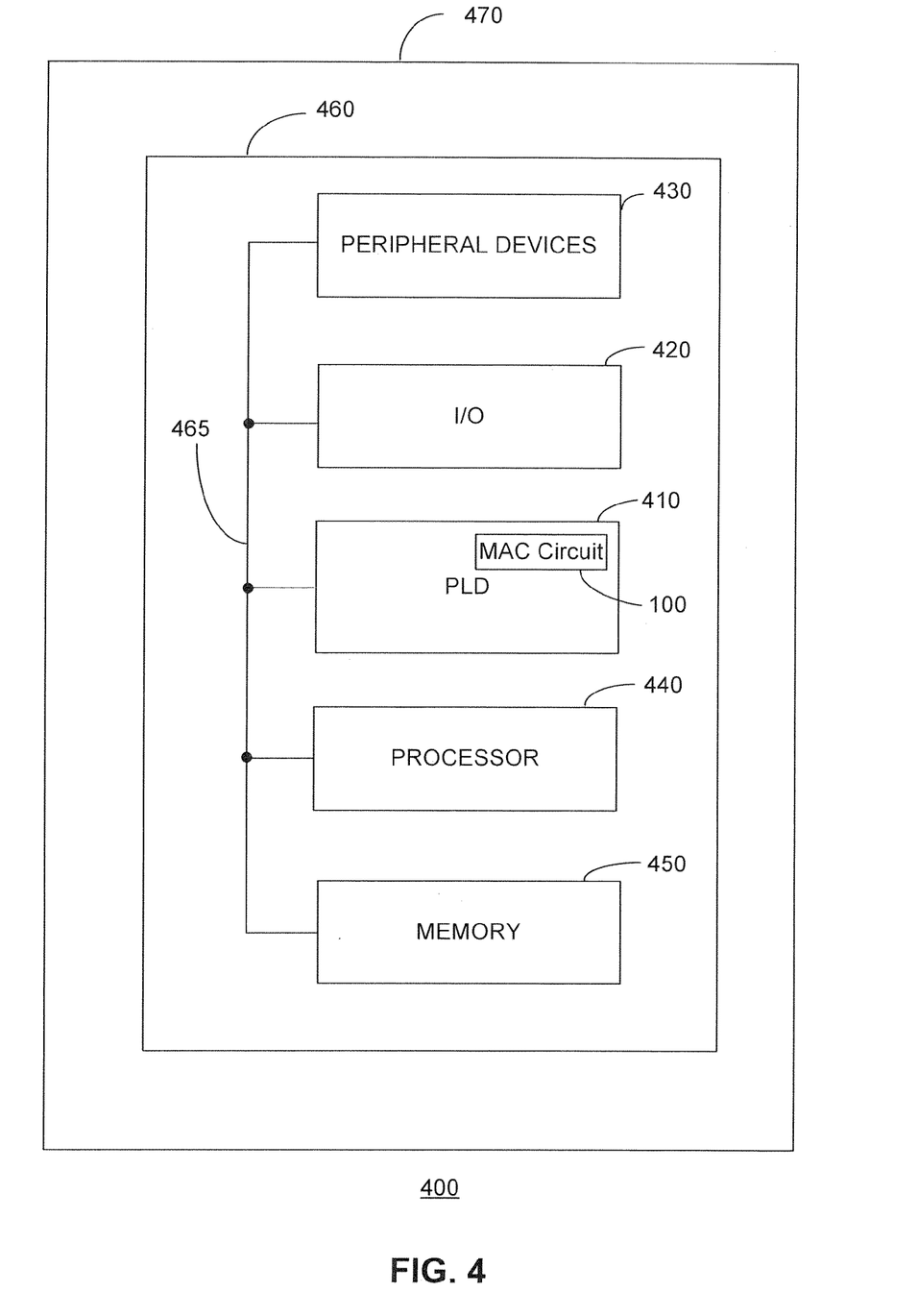
FIG. 4 illustrates an exemplary data processing system including a programmable logic device in which MAC circuits in accordance with an embodiment of the present invention might be implemented.

FIG. 4 illustrates an exemplary data processing system including a PLD in which MAC circuits in accordance with an embodiment of the present invention might be implemented. In FIG. 4, data processing system 400, among other things, includes PLD 410. As one example, MAC circuits of the present invention may be implemented in PLDs such as PLD 410. In one embodiment, MAC circuit 100 is on the same die/chip as PLD 410. Data processing system 400 may include one or more of the following components: processor 440, memory 450, input/output (I/O) circuitry 420, and peripheral devices 430. These components are coupled together by system bus 465 and are populated on circuit board 460 which is contained in end-user system 470. A data processing system such as system 400 may include a single end-user system such as end-user system 470 or may include a plurality of systems working together as a data processing system.

System 400 can be used in a wide variety of applications, such as computer networking, data networking, instrumentation, video processing, digital signal processing, or any other application where the advantage of using programmable or reprogrammable logic in system design is desirable. PLD 410 can be used to perform a variety of different logic functions. For example, PLD 410 can be configured as a processor or controller that works in cooperation with processor 440 (or, in alternative embodiments, a PLD might itself act as the sole system processor). PLD 410 may also be used as an arbiter for arbitrating access to shared resources in system 400. In yet another example, PLD 410 can be configured as an interface between processor 440 and one of the other components in system 400. It should be noted that system 400 is only exemplary.

In one embodiment, system 400 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

---

COMPUTER PROGRAM LISTING

```
public abstract class VariableRateShiftRegister {
    private int wordsPerRead;
    protected int wordsPerWrite;
    private int baseWriteAddress;
    private int maxWordsPerWrite;
    protected VariableRateShiftRegister(int wordsPerRead, int maxWordsPerWrite) {
        if (wordsPerRead > maxWordsPerWrite) {
            throw new IllegalArgumentException("wordsPerRead (" + wordsPerRead
```

COMPUTER PROGRAM LISTING
-continued

```
+ ") must be < wordsPerWrite (" + maxWordsPerWrite + ")");
        }
        if (wordsPerRead < 0) {
                throw new IllegalArgumentException("wordsPerRead (" + wordsPerRead
+ ") must be > 0");
        }
        if (maxWordsPerWrite < 0) {
                throw new IllegalArgumentException("wordsPerWrite (" +
maxWordsPerWrite + ") must be > 0");
        }
        this.wordsPerRead = wordsPerRead;
        this.wordsPerWrite = maxWordsPerWrite;
        this.maxWordsPerWrite = wordsPerWrite;
        baseWriteAddress = maxWordsPerWrite;
    }
    public boolean advance(long[ ] newData) {
        return advance(newData, true);
    }
    public abstract boolean advance(long[ ] newData, boolean isValid);
    public abstract long[ ] getData( );
    public abstract int getValid( );
    public int getBaseWriteAddress( ) {
        return baseWriteAddress;
    }
    public int getWordsPerRead( ) {
        return wordsPerRead;
    }
    public int getWordsPerWrite( ) {
        return wordsPerWrite;
    }
    public void setWordsPerWrite(int wordsPerWrite) {
        throw new UnsupportedOperationException( );
    }
    public int getMaxWordsPerWrite( ) {
        return maxWordsPerWrite;
    }
}
public class BehaviouralVariableRateShiftRegister extends VariableRateShiftRegister {
    private long[ ] mainQueue;
    private long[ ] supplementaryQueue;
    private int[ ] valids;
    private int need;
    private int mainGot;
    private int supplementaryGot;
    private boolean doAdvance;
    private int supplementaryWordsThisRead;
    private int currentValids;
    private int validRemainder;
    public BehaviouralVariableRateShiftRegister(int wordsPerRead, int maxWordsPerWrite)
{
        super(wordsPerRead, maxWordsPerWrite);
        mainQueue = new long[getWordsPerWrite( )];
        supplementaryQueue = new long[Math.min(getWordsPerWrite( ) – 1,
getWordsPerRead( ) * 2 – 2)];
        currentValids = (getWordsPerWrite( ) + getWordsPerRead( ) – 1) /
getWordsPerRead( );
        valids = new int[currentValids];
        validRemainder = wordsPerWrite % wordsPerRead;
        validRemainder = validRemainder == 0 ? wordsPerRead : validRemainder;
        need = 0;
        mainGot = 0;
        supplementaryGot = 1;
        doAdvance = true;
    }
    public boolean advance(long[ ] newData, boolean isValid) {
        if (!isValid && doAdvance)
                assert (newData.length == wordsPerWrite);
        boolean readNewData = false;
        if (doAdvance) {
                for (int i = 0; i < supplementaryQueue.length; i++) {
                        supplementaryQueue[i] = mainQueue[i + 1];
                }
                supplementaryGot = mainGot + 1;
                boolean needsNewData = getWordsPerWrite( ) – mainGot < 2 *
```

-continued

COMPUTER PROGRAM LISTING

```
getWordsPerRead( );
                if (isValid && needsNewData) {
                        for (int i = 0; i < newData.length; i++) {
                                mainQueue[i] = newData[i];
                        }
                        for (int i = 0; i < valids.length; i++) {
                                if (i < currentValids - 1) {
                                        valids[i] = getWordsPerRead( );
                                } else if (i == currentValids - 1) {
                                        valids[i] = validRemainder;
                                } else {
                                        valids[i] = 0;
                                }
                        }
                        mainGot = 0;
                        readNewData = true;
                } else {
                        for (int i = 0; i < mainQueue.length - getWordsPerRead( ); i++) {
                                mainQueue[i] = mainQueue[getWordsPerRead( ) + i];
                        }
                        for (int i = 0; i < valids.length - 1; i++) {
                                valids[i] = valids[i + 1];
                        }
                        valids[valids.length - 1] = 0;
                        mainGot += getWordsPerRead( );
                }
        }
        return readNewData;
    }
    public long[ ] getData( ) {
        long[ ] rval = new long[getWordsPerRead( )];
        supplementaryWordsThisRead = need == mainGot || need < supplementaryGot ?
0 : Math.min(getWordsPerWrite( ) - need, getWordsPerRead( ));
        for (int i = 0; i < supplementaryWordsThisRead; i++) {
            rval[i] = supplementaryQueue[need - supplementaryGot + i];
        }
        for (int i = supplementaryWordsThisRead; i < getWordsPerRead( ); i++) {
            rval[i] = mainQueue[i - supplementaryWordsThisRead];
        }
        doAdvance = !(supplementaryGot > mainGot && supplementaryWordsThisRead
== getWordsPerRead( ));
        need = (need + getValid( )) % getWordsPerWrite( );
        return rval;
    }
    public void setWordsPerWrite(int wordsPerWrite) {
        assert (getValid( ) == 0);
        assert (wordsPerWrite <= getMaxWordsPerWrite( ) && wordsPerWrite >=
getWordsPerRead( ));
        this.wordsPerWrite = wordsPerWrite;
        currentValids = (wordsPerWrite + getWordsPerRead( ) - 1) / getWordsPerRead( );
        validRemainder = wordsPerWrite % getWordsPerRead( );
        validRemainder = validRemainder == 0 ? getWordsPerRead( ) : validRemainder;
    }
    public int getValid( ) {
        int rval = Math.max(0, valids[0] - supplementaryWordsThisRead) +
(supplementaryWordsThisRead);
        assert (rval >= 0);
        return rval;
    }
    public static void main(String[ ] args) {
        int wordsPerWrite = 8;
        int wordsPerRead = 3;
        System.out.println("Comparing with wordsPerWrite=" + wordsPerWrite + " and
wordsPerRead=" + wordsPerRead);
        long[ ] stimulus = new long[wordsPerWrite * 7];
        for (int i = 0; i < stimulus.length; i++) {
            stimulus[i] = i + 1;
        }
        VariableRateShiftRegister vrs = new
BehaviouralVariableRateShiftRegister(wordsPerRead, wordsPerWrite);
        long[ ] response = new long[wordsPerWrite * 7];
        long[ ] toWrite = null;
        int responsePos = 0;
        int stimulusPos = 0;
        boolean hasWritten = true;
        while (responsePos < response.length) {
            long[ ] read = vrs.getData( );
            int valid = vrs.getValid( );
```

-continued

COMPUTER PROGRAM LISTING

```
                boolean atStart = responsePos < vrs.getWordsPerRead( );
                boolean atEnd = responsePos > wordsPerWrite * 7 –
vrs.getWordsPerRead( );
                for (int i = 0; i < valid; i++) {
                        if (responsePos < response.length)
                                response[responsePos++] = read[i];
                }
                boolean doWrite= stimulusPos < stimulus.length;
                if (doWrite && hasWritten) {
                        toWrite = new long[vrs.getWordsPerWrite( )];
                        for (int i = 0; i < toWrite.length; i++) {
                                toWrite[i] = stimulus[stimulusPos++];
                        }
                }
                hasWritten = vrs.advance(toWrite, doWrite);
        }
        for (int i = 0; i < response.length; i++) {
                System.out.println(response[i]);
        }
        wordsPerWrite = 5;
        vrs.setWordsPerWrite(wordsPerWrite);
        System.out.println("Comparing with wordsPerWrite=" + wordsPerWrite + " and
wordsPerRead=" + wordsPerRead);
        response = new long[wordsPerWrite * 7];
        stimulus = new long[wordsPerWrite * 7];
        for (int i = 0; i < stimulus.length; i++) {
                stimulus[i] = i + 1;
        }
        responsePos = 0;
        stimulusPos = 0;
        hasWritten = true;
        while (responsePos < response.length) {
                long[ ] read = vrs.getData( );
                int valid = vrs.getValid( );
                boolean atStart = responsePos < vrs.getWordsPerRead( );
                boolean atEnd = responsePos > wordsPerWrite * 7 –
vrs.getWordsPerRead( );
                for (int i = 0; i < valid; i++) {
                        if (responsePos < response.length)
                                response[responsePos++] = read[i];
                }
                boolean doWrite= stimulusPos < stimulus.length;
                if (doWrite && hasWritten) {
                        toWrite = new long[vrs.getWordsPerWrite( )];
                        for (int i = 0; i < toWrite.length; i++) {
                                toWrite[i] = stimulus[stimulusPos++];
                        }
                }
                hasWritten = vrs.advance(toWrite, doWrite);
        }
        for (int i = 0; i < response.length; i++) {
                System.out.println(response[i]);
        }
    }
}
```

What is claimed is:

1. A multiply-accumulate (MAC) circuit comprising:
a queue circuit, wherein the queue circuit comprises:
   a main queue;
   a supplementary queue; and
   M multiplexers, where M is an integer greater than one, and wherein each multiplexer of the M multiplexers is coupled to the main queue and to the supplementary queue,
   wherein a size Q of the main queue is greater than M, wherein Q is an integer, and wherein a size S of the supplementary queue is the smaller of 2M–2 and Q–1.

2. The MAC circuit of claim 1, wherein the main queue is programmable at runtime.

3. The MAC circuit of claim 1, wherein Q is programmable at runtime.

4. The MAC circuit of claim 1 further comprising:
M multiplier elements, wherein each multiplier element of the M multiplier elements is coupled to receive a multiplicand from the queue circuit; and
an accumulator circuit coupled to receive M outputs of the M multiplier elements and to provide an output of the MAC circuit.

5. The MAC circuit of claim 4, wherein the accumulator circuit comprises:
a remainder register;
a first adder circuit coupled to receive the M outputs of the M multiplier elements and an output of the remainder register;
an accumulator register coupled to receive an output of the first adder circuit and to provide the output of the MAC circuit; and a second adder circuit coupled to receive the M outputs of the M multiplier elements and to provide an input to the remainder register.

6. The MAC circuit of claim 1, wherein the queue circuit comprises:
a plurality of queue modules, wherein each queue module of the plurality of queue modules comprises:
a main queue programmable at runtime; and
a supplementary queue.

7. A programmable logic device comprising the MAC circuit of claim 1.

8. A data processing system comprising a programmable logic device including the MAC circuit of claim 1.

9. A multiply-accumulate (MAC) circuit comprising:
a first main queue coupled to receive a word of input data;
a first supplementary queue coupled to receive a copy of a portion of the word of input data;
a first group of M multiplexers, where M is an integer greater than one, wherein each multiplexer of the first group of M multiplexers is coupled to a corresponding position in the first main queue and to M−1 positions of the first supplementary queue;
M multiplier elements, wherein each multiplier element of the M multiplier elements is coupled to receive an output of a corresponding multiplexer of the first group of M multiplexers;
a second group of M multiplexers, wherein each multiplexer of the second group of M multiplexers is coupled to a binary LOW value on a first input and a corresponding output of one multiplier element of the M multiplier elements on a second input;
a carry multiplexer;
a first adder element coupled to receive an output of each multiplexer of the second group of M multiplexers and an output of the carry multiplexer;
an accumulator register coupled to receive an output of the first adder element;
a third group of M multiplexers, wherein each multiplexer of the third group of M multiplexers is coupled to the binary LOW value on a first input and a corresponding output of one multiplier element of the M multiplier elements on a second input;
a second adder element coupled to receive an output of each multiplexer of the third group of M multiplexers; and
a remainder register coupled to receive an output of the second adder element and to provide an input to the carry multiplexer, wherein the carry multiplexer is coupled to the binary LOW value on a first input and an output of the remainder register on a second input.

10. The MAC circuit of claim 9 further comprising:
a second main queue coupled to receive a word of input coefficients;
a second supplementary queue coupled to receive a copy of a portion of the word of input coefficients; and
a fourth group of M multiplexers, wherein each multiplexer of the fourth group of M multiplexers is coupled to a corresponding position in the second main queue and to M−1 positions of the second supplementary queue.

11. A programmable logic device comprising the MAC circuit of claim 9.

12. A data processing system comprising a programmable logic device including the MAC circuit of claim 9.

13. A method of performing multiply-accumulate (MAC) operations, the method comprising:
programming a size of a main queue to be Q, where Q is an integer representing a size of a word to be processed;
reading M data elements from a combination of positions of the main queue and a supplementary queue, wherein T data elements are read from the supplementary queue and (M−T) data elements are read from the main queue, where T is an integer greater than or equal to 0 and less than or equal to M; and
programming a size S of the supplementary queue, wherein S is an integer and is the smaller of 2M−2 and Q−1.

14. The method of claim 13, wherein the programming comprises:
programming the size of the main queue at runtime.

15. The method of claim 13 further comprising:
providing M data elements to M multiplier elements such that each of the M data elements is provided to a corresponding multiplier element of the M multiplier elements; and
accumulating outputs of the M multiplier elements.

16. The method of claim 15 further comprising:
changing contents of the main queue and the supplementary queue if:
(i) an index of a first data element at a head of the supplementary queue is less than or equal to an index of a second data element at a head of the main queue, or
(ii) T is not equal to M at a previous stage.

17. The method of claim 16, wherein the changing the contents of the main queue and the supplementary queue comprises:
copying S data elements from the main queue to the supplementary queue;
advancing each data element in the main queue by M positions if a number of data elements in the main queue is greater than or equal to 2M; and
supplying Q new data elements to the main queue if the number of data elements in the main queue is less than 2M.

18. The method of claim 15, wherein the providing the M data elements to the M multiplier elements comprises:
providing the M data elements from the main queue if:
(i) an index of a next needed data element is equal to an index of the data element at the head of the main queue, or
(ii) the index of the next needed data element is less than the index of the data element at the head of the supplementary queue.

19. The method of claim 15, wherein the providing the M data elements to the M multiplier elements comprises:
providing T data elements from the supplementary queue, where T is an integer equal to the smaller of (a) Q minus the index of the next needed data element and (b) M, and providing M−T data elements from the main queue if:
(i) the index of the next needed data element is not equal to the index of the data element at the head of the main queue, and
(ii) the index of the next needed data element is not less than the index of the data element at the head of the supplementary queue.

* * * * *